United States Patent [19]

Burke et al.

[11] Patent Number: 5,793,772
[45] Date of Patent: Aug. 11, 1998

[54] METHOD AND APPARATUS FOR SYNCHRONIZING TIMING OF COMPONENTS OF A TELECOMMUNICATION SYSTEM

[75] Inventors: Timothy M. Burke, Algonquin; Michael Mannette, Bloomingdale; Rob Bahary, Buffalo Grove, all of Ill.

[73] Assignee: Motorola, Inc., Schaumburg, Ill.

[21] Appl. No.: 564,606

[22] Filed: Nov. 29, 1995

[51] Int. Cl.[6] .................................................. H04J 3/06
[52] U.S. Cl. ........................... 370/508; 370/519; 375/356
[58] Field of Search .............................. 370/17, 29, 79, 370/84, 85.1, 85.2, 85.7, 85.11, 95.1, 95.3, 507, 508, 509, 513, 514, 503, 516, 517, 519; 455/33.1, 33.2, 33.3, 34.1, 34.2; 375/356, 357, 358

[56] References Cited

U.S. PATENT DOCUMENTS

4,811,338  3/1989  Haruyama ........................... 370/85
5,528,596  6/1996  Fisher ................................ 370/95.3
5,617,410  4/1997  Matsumoto ......................... 370/342

Primary Examiner—Douglas W. Olms
Assistant Examiner—Matthew C. Phillips
Attorney, Agent, or Firm—J. Ray Wood

[57] ABSTRACT

A method for synchronizing timing of signal transmissions in a telecommunication system (100) determines a "fixed portion" (222) of the propagation delay between the central unit (102) and subscribers (206, 208) in a particular node (202). Additionally, the method determines a 'variable portion' (226) of the propagation delay that accounts for the variation of spacing of different subscribers (e.g., homes (206, 208)) on a particular node (202). The preferred method offsets the control unit's (102) receiving window (410) in accordance with the fixed portion, and directs the various subscriber units (206, 208) to offset the timing of signals (314, 322) (i.e., bursts of data) that they transmit by the variable portion (226).

50 Claims, 6 Drawing Sheets

METHOD AND APPARATUS FOR SYNCHRONIZING TIMING OF COMPONENTS OF A TELECOMMUNICATION SYSTEM

BACKGROUND

The present invention relates, in general, to telecommunication systems, and more particularly to synchronizing timing of signals transmitted in telecommunication systems.

Certain telecommunications schemes require that signals and/or information transmitted from a remote location arrive at another location during a predetermined time slot. For example, a telecommunication system using Time Division Multiple Access (TDMA) requires that bursts of information transmitted by a transmitting device be received during a predetermined/known time slot at the receiving device. In a TDMA based system, individual users may share a transmission medium by being assigned, for a limited time, to one or more time slots.

The above discussed time synchronization requirements present a particular problem when there exists an unknown or undetermined propagation delay between the transmitting device and the receiving device. When the propagation delay is unknown, the transmitting device does not know when to send the burst of information such that the burst arrives at the receiving device during the required time slot.

An example of a system having unknown propagation delays between transmitting and receiving devices is a typical cable communication infrastructure. Cable communication infrastructures typically comprise a hub servicing various nodes, such that one or more nodes are at the end of each spoke of the hub. The spokes are typically fiber optic cable. The fiber optic cable leads to a distribution portion of coaxial cable extending to individual subscribers such as homes, businesses, etc. The distribution portion at the end of a particular spoke is often divided into manageable subsets, for example 20 kilometer radius subsets, which are the individual nodes. The nodes typically include one or more subscriber drops that connect the individual subscribers to the cable communication system.

The layout of cable communication networks tend to vary in response to various geographic conditions, which effectuates different propagation delays between each different home or other subscriber to the hub. Furthermore, there are dynamic variations in propagation delay due to varying physical conditions of the cable, as well as temperature and other weather conditions. Nevertheless, a control unit at the hub is responsible for receiving and actively routing signals and bursts of information from each of the various subscribers, and must therefor receive signals from the subscribers during predetermined time slots. Signals sent from the subscribers must be sent at the proper time so that they do not overlap time slots, otherwise they will interfere with one another and be unreadable by the control unit.

While cable communication infrastructures have traditionally been associated with television transmission, they are now being utilized more and more for two way communications employing schemes requiring time synchronization between components. Consequently, a method is needed for synchronizing the timing of signal transmissions in telecommunication systems where there are unknown propagation delays between various components of the systems. Furthermore, what is particularly desirable is a synchronization scheme that is suited for use in the context of a cable communication infrastructure.

DETAILED DESCRIPTION OF THE DRAWINGS

Generally, the present invention provides methods and apparatus for synchronizing the timing of signals transmitted in a telecommunication system. More specifically, the scope of the methods and apparatus of the present invention is particularly suited for synchronizing timing of signals in a telecommunication system utilizing a cable communication infrastructure.

A preferred embodiment of the present invention, as is explained in greater detail below, determines a "fixed portion" of the propagation delay between the cable control unit (or hub) and individual subscribers in a particular node. Additionally, the methods and apparatus determine the different "variable portions" of the propagation delay that account for the variation of spacing of different subscribers (e.g., homes) on a particular node from the hub. Thus, while each individual subscriber on a particular node has the same fixed portion of the propagation delay, the variable portion of the delay likely varies for each subscriber. In accordance with the principles of the present invention, once the fixed portion is determined, the cable control unit offsets the receiving time slot by the fixed portion and directs the various subscriber units to offset the timing of signals that they transmit (i.e., bursts of information data), by the variable portion.

Figure 1:
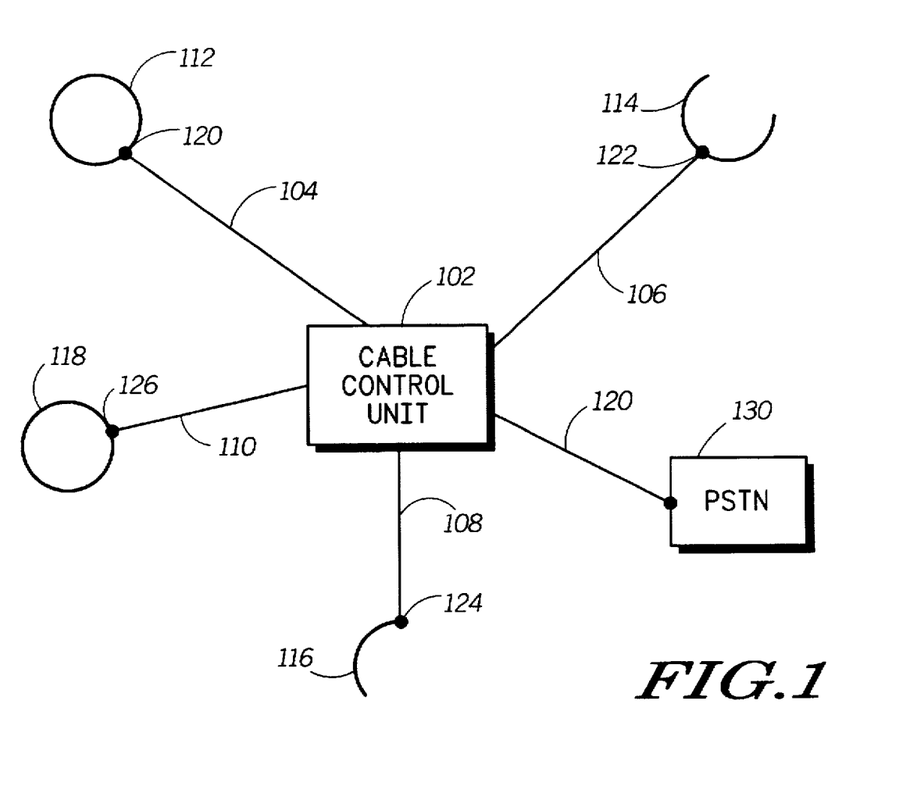
FIG. 1 is a schematic diagram of a telecommunication system using a cable communication infrastructure.

Turning to the figures for a more detailed understanding of the principles of the present invention, FIG. 1 shows a schematic overview of a cable communication infrastructure configured for two way communications such as, for example, the placement of telephone calls or the bi-directional transmission of computer data. Referring to FIG. 1, a telecommunication system 100 consists of a cable control unit 102 (CCU). The cable control unit 102 serves to receive and actively route signals (i.e., information) throughout the system 100, as well as to carry out other system administration functions.

Extending from the cable control unit 102 (i.e., hub) are several spokes 104, 106, 108 and 110, which are preferably fiber optic cables. The spokes 104–110 may be of other suitable transmission medium, such as low-loss coaxial cable, depending upon the particular application, topography and system requirements. The spokes 104–110 serve as "trunks" for the telecommunication system 100, as is readily apparent to persons skilled in art.

The fiber optic spokes 104–110 each lead to a particular one of the distribution portions 112, 114, 116 and 118, respectively. Each one of the distribution portions 112–118 is located at the end of the corresponding one of the spokes 104–110, each of which effectively terminates at one of the distribution points 120, 122, 124 and 126, respectively. Typically, the distribution portions 112–118 consist of coaxial cable, rather than fiber optic cable, that distributes signals to and from individual subscribers, as is shown in more detail in FIG. 2.

The distribution portions 112–118 are shown in a variety of representative configurations in order to illustrate that such variety may be employed. For example, the distribution portion 112 is shown as a loop, whereas distribution portions 114 and 116 are shown as varying stubs. Thus, the specific configuration selected for each distribution portion is not considered to be a limiting factor of the present invention.

In addition to distribution portions, cable control unit 102 may also be connected to other communication systems via gateways. For example, a spoke 128 extends from control unit 102 to a Public Switched Telephone Network (PSTN) 130. The spoke 128 can be a fiber optic cable similar to the spokes 104–110, or spoke 128 may be any other suitable transmission medium that is known to persons skilled in the art. Thus, the communication system 100 may be utilized to access all commonly available communications networks via cable 128 and various gateways, such as PSTN 130.

Figure 2:
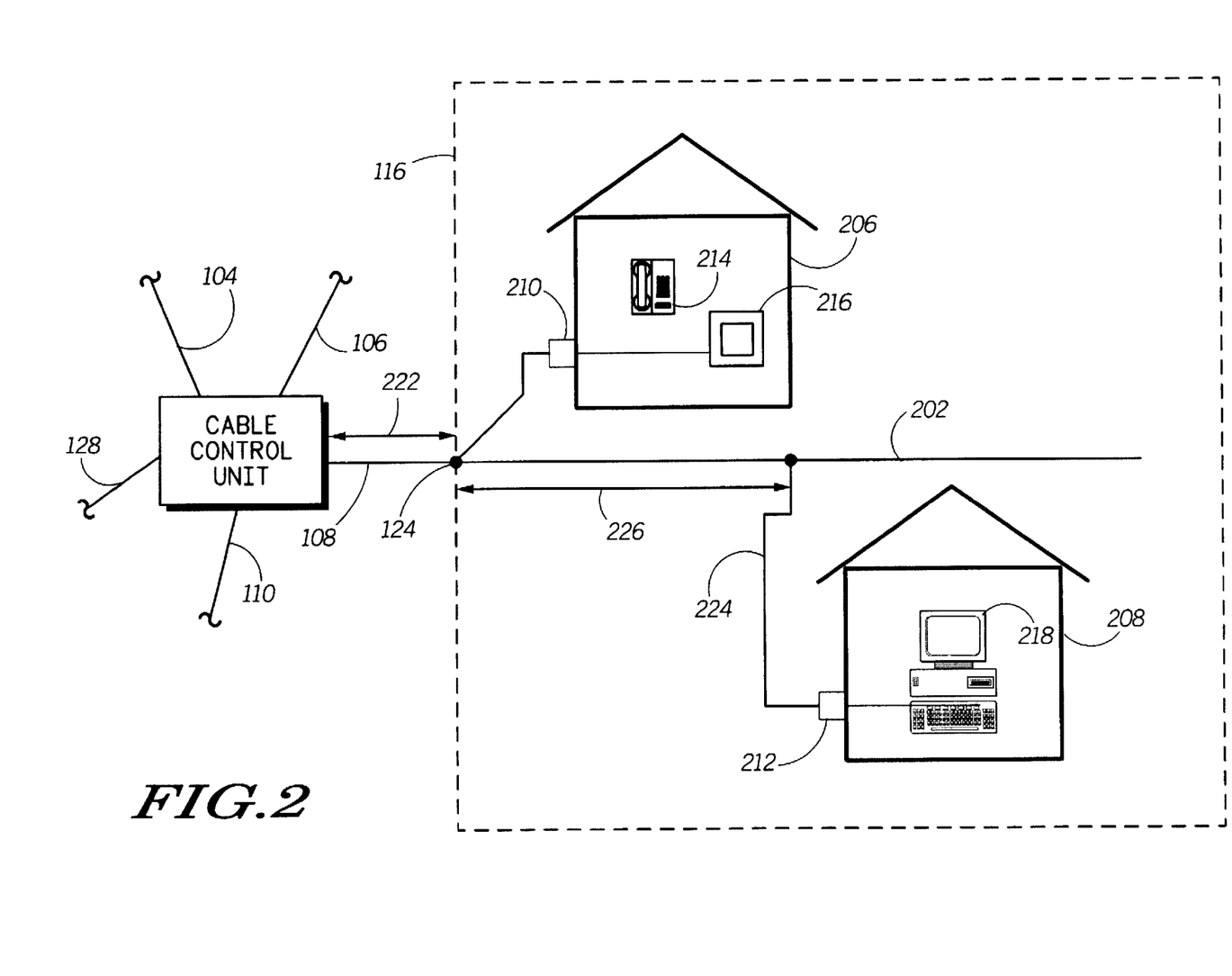
FIG. 2 is a schematic diagram of a single node of the telecommunication system shown in FIG. 1.

FIG. 2 is a schematic diagram of a portion of telecommunication system 100 that illustrates the principles of the present invention in conjunction with distribution portion 116. Persons skilled in the art will appreciate that these principles apply equally to each of the distribution portions shown and described with respect to FIG. 1, as well of other configurations of distribution portions not shown.

Distribution portion 116 preferably includes a coaxial trunk cable 202 as the transmission medium for a node 204 shown in FIG. 2. The node 204 includes two different subscriber homes 206 and 208 that are dropped from the trunk cable 202. In the preferred arrangement, the node 204 consists of all the subscribers such as the homes 206 and 208 along one twenty kilometer stretch of the distribution portion 116. While, twenty kilometers is chosen in a somewhat arbitrary manner, that distance appears to provide fairly manageable subdivisions within a distribution portion. For example, if multiple subscribers on an individual node were more distant from each other than approximately twenty kilometers, the propagation delays back to the cable control unit may vary to such an extent that communications would become cumbersome, and possibly even ineffective given the current state of telecommunications transmission equipment.

As shown in FIG. 2, each of the subscriber homes 206 and 208 is connected to the telecommunication system 100 via cable access units 210 and 212, respectively. The cable access units 210 and 212, which are mounted on the exterior of the subscribing homes 206 and 208, respectively, are also referred to as subscriber units. Each of the subscriber units 210 and 212 preferably consists of an interface box that includes software and electronics to provide the subscriber with a variety of forms of access to the telecommunication system 100.

The flexibility of access provided by the subscriber units 210 and 212 is illustrated by the various equipment within the subscribing homes 206 and 208 shown coupled to the subscriber units 210 and 212. For example, home 206 has a telephone 214 and a television 216 (or set top box) coupled to the subscriber unit 210, and thereby to the telecommunication system 100. Similarly, subscriber home 208 shows a personal computer 218 coupled to the subscriber unit 212.

The subscriber units provide two way data transmission capability between each household or business and the cable control unit 102. Thus, telephone 214, television 216 and computer 218 are all provided with a bi-directional data communication path to cable control unit 102. It will be understood by those skilled in the art that the software and electronics that provide the functionality to the subscriber units 210 and 212 may alternatively reside, in whole or in part, inside the individual equipment 214, 216 and 218, in which case that equipment, or the combination of the equipment and the cable access unit, would be considered the subscriber equipment or subscriber unit.

FIG. 2 illustrates aspects of the undetermined propagation delay problem that are addressed by the methods and apparatus of the present invention. More specifically, FIG. 2 illustrates that a "fixed portion" of the propagation delay between the subscriber equipment and the control unit exists along the spoke 108. For simplicity in explanation, spoke 108 is considered to be effectively terminated at distribution point 124, which represents the first subscriber drop 220.

The fixed portion, as indicated by the arrow 222, is considered fixed because it is the delay caused by trunks, fiber links, etc., common to each subscriber unit, and each unit will experience at least this much delay. Consequently, the fixed delay is substantially identical for all individual subscriber units in given node (e.g., subscriber units 210 and 212 in node 204).

It should be noted that, for simplicity and clarity, it is assumed that the drops 220 and 224 joining the homes 206 and 208 to the distribution cable 202 add no significant delay. Otherwise, and in accordance with the principles of the present invention, the delay of drop 220 is added to the fixed portion so that the fixed portion is nonetheless the minimum delay experienced by any particular subscriber, because it is based upon the subscriber nearest the cable control unit 102.

Additionally, a "variable portion" of the propagation delay is shown in FIG. 2, as indicated by arrow 226, that represents the time the signal travels between individual subscriber drops 220 and 224. This portion is considered variable because it is different for each subscriber unit along cable 202. As the length of coaxial cable from the cable control unit 102 is extended, the cable becomes more susceptible to the dynamic variations discussed in the background section above. In accordance with the principles of the present invention, both the fixed portion 222 and the variable portion 226 of the propagation delay are determined and compensated for so that signals sent from the subscriber units 210 and 212 arrive at the control unit 102 during the proper predetermined time slot.

Figure 3:
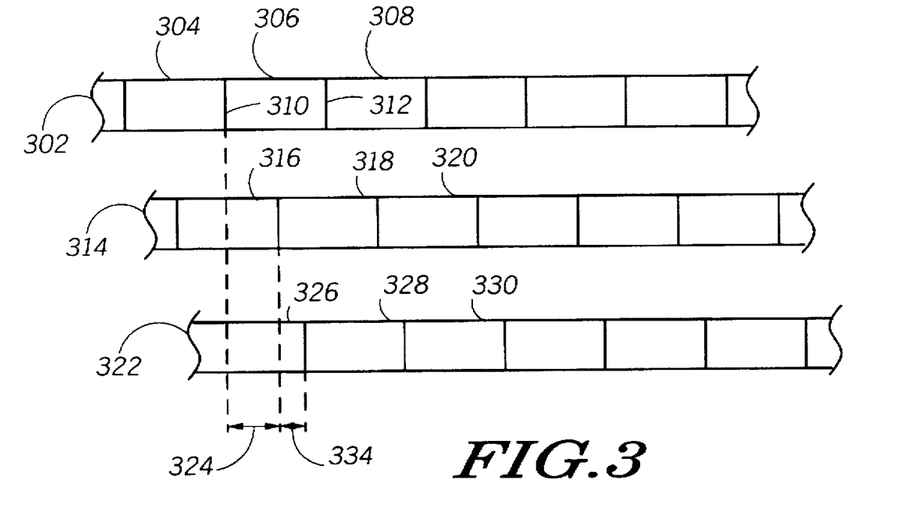
FIG. 3 is a timing diagram illustrating the initial relative timing of a cable control unit and two different representative subscriber units within the single node shown in FIG. 2.

FIG. 3 is a timing diagram illustrating the initial relative timing of the control unit 102 and the two subscriber units 210 and 212 of node 204 of FIG. 2. More specifically, time slot series 302 illustrates the timing of consecutive time slots 304, 306 and 308 as synchronized within the control unit 102. When the control unit 102 transmits signals it does so within the confines of particular predetermined time slots, as indicated for example by the vertical lines 310 and 312 marking the beginning and end, respectively, of time slot 306. Similarly, when the control unit 102 receives subscriber signals from subscriber units, they must be received within the confines of a particular time slot (e.g., time slot 306). These timing requirements are consistent with commonly used synchronous communication protocols, including TDMA.

Time slot series 314 illustrates the relative timing of the consecutive time slots 316, 318 and 320 that are associated with the subscriber unit 210, prior to the operation of the timing compensation principles of the present invention by the telecommunication system 100 (i.e., that the signals/information bursts received, and more importantly generated, by the subscriber unit 210 are synchronized so that differences between time slot series 302 and time slot series 314 are compensated for). Time slot series 322 illustrates the relative timing of consecutive time slots 326, 328 and 330 that are associated with subscriber unit 212 prior to the implementation of timing compensation as described above.

It should be noted that FIG. 3 shows the relative positions of the different slot series 302, 314, 322 as they are observed at the control unit 102. That is, the time delay 324 between time series 302 and time series 314 results from the propagation delay caused by the path length 222 shown in FIG. 2—i.e., the path between the distribution point 124 (where the drop 220 to the subscriber unit 210 is made) and the control unit 102. It should also be noted that the delay 324 represents only the remainder/fractional portion of a time slot, and the actual propagation delay over the path 222 may be several time slots plus the fractional portion 324.

In a similar manner, a time delay 334 between time series 314 and series 322 results from the additional propagation delay as a result of the path length 226 shown in FIG. 2 (the path along trunk 202 between the drop 220 and the drop 224). Time delay 324 represents the fixed portion of the propagation delay because no other subscribers are between the home 206 and the hub 102, while time delay 334 represents the variable portion. It will be understood that if additional homes (not shown) are located along the trunk 202, each of those homes would have a unique variable portion of the delay that must be compensated for.

Figure 4:
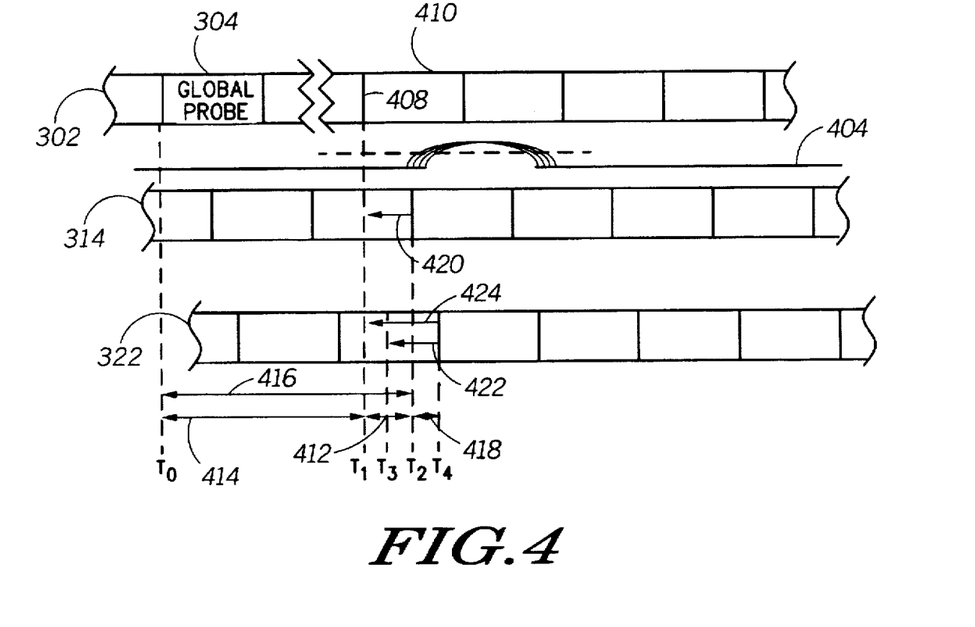
FIG. 4 is a timing diagram illustrating a scheme for determining and compensating the fixed and variable portions of the propagation delay for a particular node.

FIG. 4 is a timing diagram illustrating how the fixed delay 324 and the variable delay 334 are determined and compensated for in accordance with the principles of the present invention. A global probe signal is transmitted by control unit 102 to all of the subscriber units (including the units 210 and 212) in the node 204 during a time slot 402. In turn, all of the subscriber units respond by sending responsive signals which are combined to form a single received signal 404.

Cable control unit 102 includes the capability to measure received signal strength in any one of a variety of equally effective ways. At the simplest level, the control unit 102 waits until a threshold value for signal strength is met, as indicated by dotted line 406, at which point it is assumed that a responsive signal has been received from the nearest subscriber unit (in this case unit 210), on the node 204. Alternatively, and in a somewhat more complicated manner requiring additional processing, the control unit 102 may detect the presence of the received signal 404 by integrating the signal over a period of time and detecting a large increase from the average value. This slope information may be used without the need of a predetermined threshold 406.

After determining that a responsive signal has been received, the control unit 102 then determines the point in time, with respect to the beginning 408 of a time slot 410 (time slot 410 represents the current time slot in which the signal was received), that the threshold 406 was reached. The control unit 102 combines that difference, shown in FIG. 4 by arrow 412, with the time for the number of time slots that have transpired since the global probe signal was sent (illustrated as arrow 414 in FIG. 4).

The sum of time segments 412 and 414 corresponds to the propagation delay 416 from the nearest subscriber unit 210 (i.e., the delay due to path 222 shown in FIG. 2) to control unit 102, and thus is considered to be the fixed portion of the propagation delay relating to the node 204. It should be apparent that the time segment 414 represents an integer number of time slot intervals, while the time segment 412 represents the fractional portion of a single time slot.

The control unit 102 compensates for the fixed portion of the delay by adjusting its receive window to account for the fixed delay. This is accomplished by delaying the processing window from time position $T_1$ to time position $T_2$, as indicated by arrow 420 (in actuality, as is understood by persons skilled in the art, the advancement is only half of the observed time shift 412 because the observed time shift represents the round-trip propagation delay rather than the one-way delay).

The determination of the variable portion of the propagation delay is accomplished by the control unit 102 as follows. It is important to note that, in accordance with the principles of the present invention, the design rules of node geographic layout require the furthest subscriber unit in a particular node have no more than one quarter (0.25) of a time slot of variable delay. That is, the distance from the nearest subscriber unit to the furthest subscriber unit be no more that one quarter (0.25) time slot, measured by propagation delay on the coaxial cable. The reason for this limitation becomes apparent from the following discussion of measurement and compensation for the variable portions of delay.

Once the control unit 102 has established the fixed portion of the propagation delay, a receiving window is established such that all time adjustment requests from the subscriber units are received within the receiving window (in FIG. 4, the receiving window corresponds to time slot 410). The subscriber units request time adjustment commands by transmitting a "short burst" that has a duration less than or equal to, and preferably equal to, one half (0.5) of a time slot. This shortened burst length, along with the network layout requirement that the furthest node introduce no more than one quarter (0.25) of a time slot of one way variable delay, ensures that the short bursts sent from even the furthest subscriber unit will reach the control unit 102 within the receiving window.

The variable portion of the propagation delay associated with the subscriber unit 212 is represented by arrow 418 in FIG. 4. Synchronization signals in the form of continuous TDM time slots are transmitted by the control unit 102 with time slot boundaries aligned at time $T_0$. Subscriber unit 210 sends a responsive short burst that arrives at the control unit 102 at time $T_1$, as indicated by arrow 420 (rather than at time $T_2$ because of the compensation due to the fixed portion of the propagation delay). In view of the fact that the short burst arrives at time $T_1$ (at the start of the receiving window), it is evidence that subscriber unit 210 has no variable portion of the propagation delay (as described above, this is because subscriber unit 210 is the closest subscriber to control unit 102 in node 204).

Applying the same principles to subscriber unit 212, however, produces different results. Taking into account the fixed portion compensation, subscriber unit 212 sends its responsive short burst such that it arrives at the control unit 102 at time $T_3$, as indicated by arrow 422 (rather than at time $T_4$ because of the compensation due to the fixed portion of the propagation delay).

The difference between time $T_3$ and the beginning of the sample window 408 (i.e., time $T_1$) corresponds to the variable portion of the propagation delay. Therefore, the subscriber unit 212 is commanded to advance its transmissions so that its signals are received by control unit 102 at time $T_1$ (as described above, the actual time advanced by unit 212 is one half of the time indicated by arrow 418). Additional subscriber units located along the trunk 202 are advanced by different variable delays depending on their distance from the closest subscriber unit 210.

Figure 5:
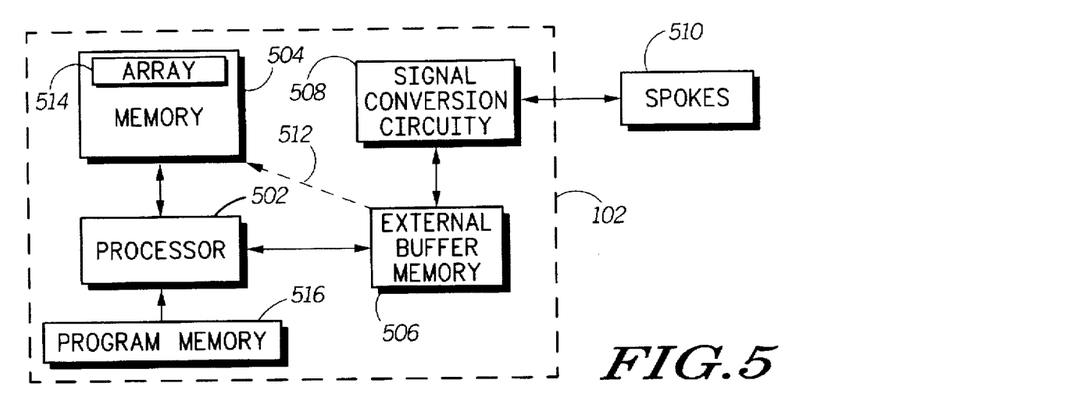
FIG. 5 is a schematic block diagram of a preferred cable control unit.

FIG. 5 provides a detailed schematic block diagram of a preferred cable control unit 102 that includes a processor 502 (preferably a digital signal processor (DSP)), a processor memory 504 (that is preferably internal memory within processor 502), an external buffer memory 506 and a signal conversion circuit 508. The conversion circuit 508, which is preferably an RF transceiver, converts analog signals received from, or transmitted to, spokes 510 (spokes 510 generically represents the spokes shown extending from the cable control unit 102 in FIG. 1) into digital signals that are stored in the buffer memory 506. The use of the buffer memory 506, while not required, is preferred to avoid wait states during the operation of the processor 502.

Figure 6:
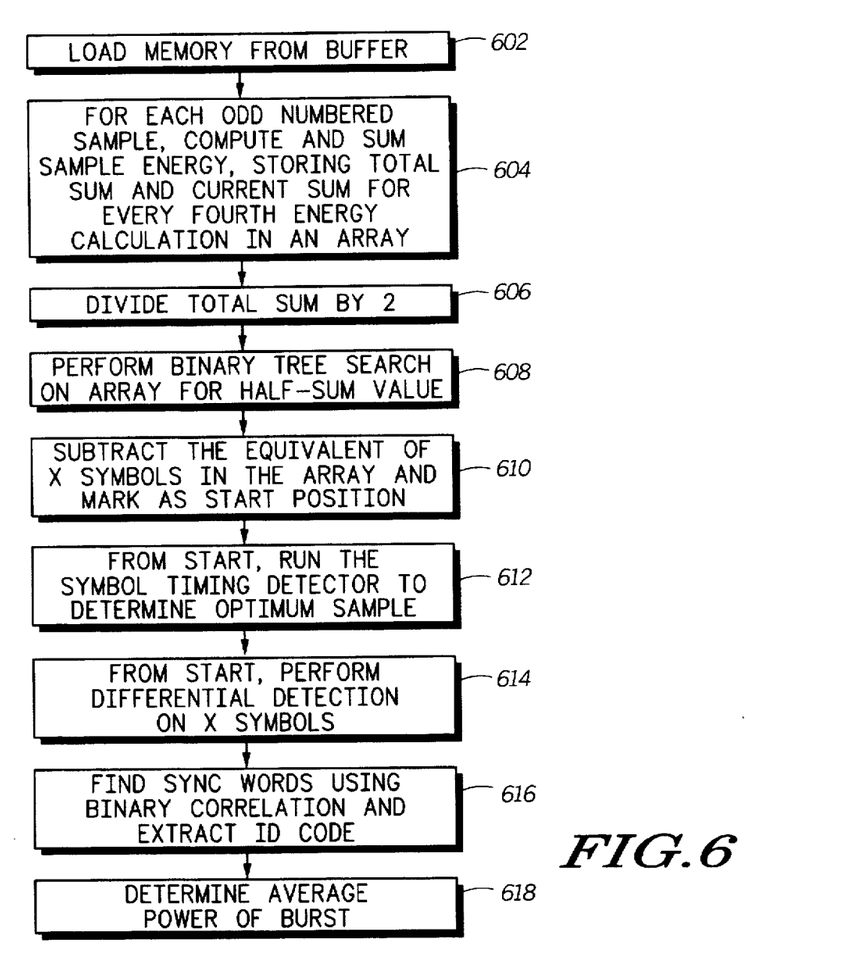
FIG. 6 is a flow chart illustrating the processing performed by the cable control unit of FIG. 5 to determine the propagation delay of a given subscriber unit.

A more detailed description of how the control unit 102 determines that a responsive signal has been received follows in conjunction with the flow chart shown in FIG. 6. Persons skilled in the art will understand that the instructions for executing the steps shown in FIG. 6 are preferably stored in a program memory 516 that is connected to the processor 502. The program memory 516 may be any non-volatile memory, such as Read-Only Memory (ROM), or it may be volatile memory, such as Random Access Memory (RAM) that is loaded upon the application of power to the control unit 102.

In preferred embodiments of the present invention, normal information bursts from the subscriber units to the control unit 102 consist of 112 symbols (i.e., 224 bits). For time alignment operations, however, a shortened burst of 48 symbols is preferred (as described above, the shortened burst should be less than or equal to one half of a time slot, which in the preferred embodiment is equal to 120 symbols). Additionally, two bits may be provided at the front of the short burst to establish a reference phase for the conversion circuitry 508.

FIG. 6 is a flow chart illustrating the processing performed by the cable control unit to determine the propagation delay of a given subscriber unit. Control unit 102 begins by loading a complete time slot of information (i.e., 120 symbols) from the buffer memory 506 in a step 602. The step 602 may be accomplished by the processor 502 or by circuitry (not shown) that directly loads the memory 504 as indicated by the dashed arrow 512 in FIG. 5. Each of the symbols is preferably represented by four samples of the analog signals received from the spokes 510, which provides an adequate balance between processor requirements and estimated burst energy (e.g., more samples per symbol would provide increased accuracy in burst energy estimates at a cost of increased processing requirements).

In a step 604, the processor 502 calculates the sample energy of each odd numbered sample (once again, to reduce substantially unnecessary processing), keeping a Total Sum of calculated energy and storing the Total Sum in an array 514 located in the memory 504 for every fourth calculation. Thus, for a given time slot, the array 514 has 60 Total Sum energy calculations. The data in the array, after processing, represents an energy profile of the complete time slot, in increasing order (because each previous sum is added to the subsequent calculation). If increased probability of estimated burst location is desired, the array 514 may have 240 elements instead of the 60 elements described above. By calculating total energy for all 240 samples instead of only 60 samples, an increase of approximately ±1 symbol of accuracy in the estimated location of the burst is achieved (at the cost of severely increased processing requirements).

The processor 502 divides the Total Sum by two (preferably, by merely shifting the Total Sum right one bit) in a step 606. Once the half-sum is been calculated in the step 606, the processor 502 performs a binary tree search on the array 514, in a step 608, looking for the array element having a Total Sum that most closely matches the half-sum. It will be understood that, although a binary tree search may be the most efficient search to find the half-sum value, other well known search methods may be employed without departing from the scope and spirit of the present invention. For example, a simple sequential search of every array element may be performed at the expense of severely increased processing time. The advantage of the binary search over the sequential search is that the half-sum may be found with only six compare operations instead of 60. The array element that most closely matches half-sum is considered to be the estimated center of the burst (i.e., the half-sum position).

The burst start position is estimated by subtracting a predetermined number x of samples from the half-sum position by the processor 502 in a step 610. This subtraction operation is performed relative to the complete frame loaded into the memory 504 in the step 602. Given the fact that the burst contains 48 symbols, X may simply be selected as 24. However, assuming a uniform energy distribution across a burst and a 10 db carrier-to-noise ratio (CNR), the worst case offset from true center for the burst is approximately ±3.3 symbols. To optimize processing for burst detection at CNR levels at or above 10 db, and to account for the possible offset from true center, the burst window is preferably shortened by 8 symbols (i.e., four at each end) resulting in a 40 symbol window, in which case X is 20 instead of 24.

The processor 502, in a step 612, runs a symbol timing detector program over a period of 2× symbols (preferably 40, as described above) of the complete slot loaded into the memory 504, beginning at the estimated start position, to determine the optimum sample to use in subsequent processing (the estimated start position of the array 514 is correlated to a substantially similar position in the complete slot loaded into the memory 504). The symbol timing detector of the step 612 determines which sample of the four samples is used to detect the information from the received signal in subsequent processing.

Once the optimum sample is chosen, the processor 502, in a step 614, runs a differential detector over the same period of symbols that were processed in the step 612. The differential detector extracts the information from the received signal, substantially removing the noise from the signal. Persons skilled in the art will readily understand that signal detection is well known in the art and that various detection programs may be implemented in performing the processing step 614 without departing from the principles of the present invention.

After the information has been extracted from the received signals in the step 614, the processor 502 performs a search of the information to detect the presence of one or more SYNC words in a step 616. In the preferred embodiment of the present invention, three twenty-four bit SYNC words are utilized. Additionally, while different SYNC words may be used, it is preferable to have identical three SYNC words, each having a bit pattern corresponding to "1F53A0." This bit pattern has been found to have high autocorrelation that reduces the processing time required for searches.

While various searching techniques may be utilized without departing from the principles of the present invention, it is preferable that the step 616 be performed by the processor 502 running a binary correlator program that moves the correlation window through the memory 504, rather than moving the memory 504 through the correlation window. The processor 502 continues running the binary correlator until all three SYNC words are located. The bit position of the first bit in the third SYNC word identifies the center position of the burst. Once the position has been identified, the processing of the step 616 completes by extracting the ID code from the word following the third SYNC word.

Once processing in the step 616 is complete, the burst position has been estimated and then precisely determined, and the ID code of the signal has been identified. Further, the propagation delay for the subscriber unit identified by the corresponding ID code has also been determined. An additional advantage of the present invention is shown by a step 618, in which the processor 502 uses the actual burst position information to perform another integration (similar to the integration of the step 604) that determines the average power of the burst. If the integration of the step 618 is performed over 32 symbols, the resultant power calculation corresponds to the average power obtained from a normal burst that may be used by the telecommunication system 100 for processing signals during normal transmissions (i.e., when full length bursts, rather than shortened bursts are utilized).

Thus, the cable control unit 102 and corresponding processing steps shown in FIG. 6 determine the propagation delays inherent in the overall telecommunication system 100. At the other end of the spokes 510, however, are subscriber units that initially send shortened bursts for timing alignment, and then perform the compensation required to overcome the propagation delays. The details of these functions are described below with respect to FIGS. 7 and 8.

Figure 7:
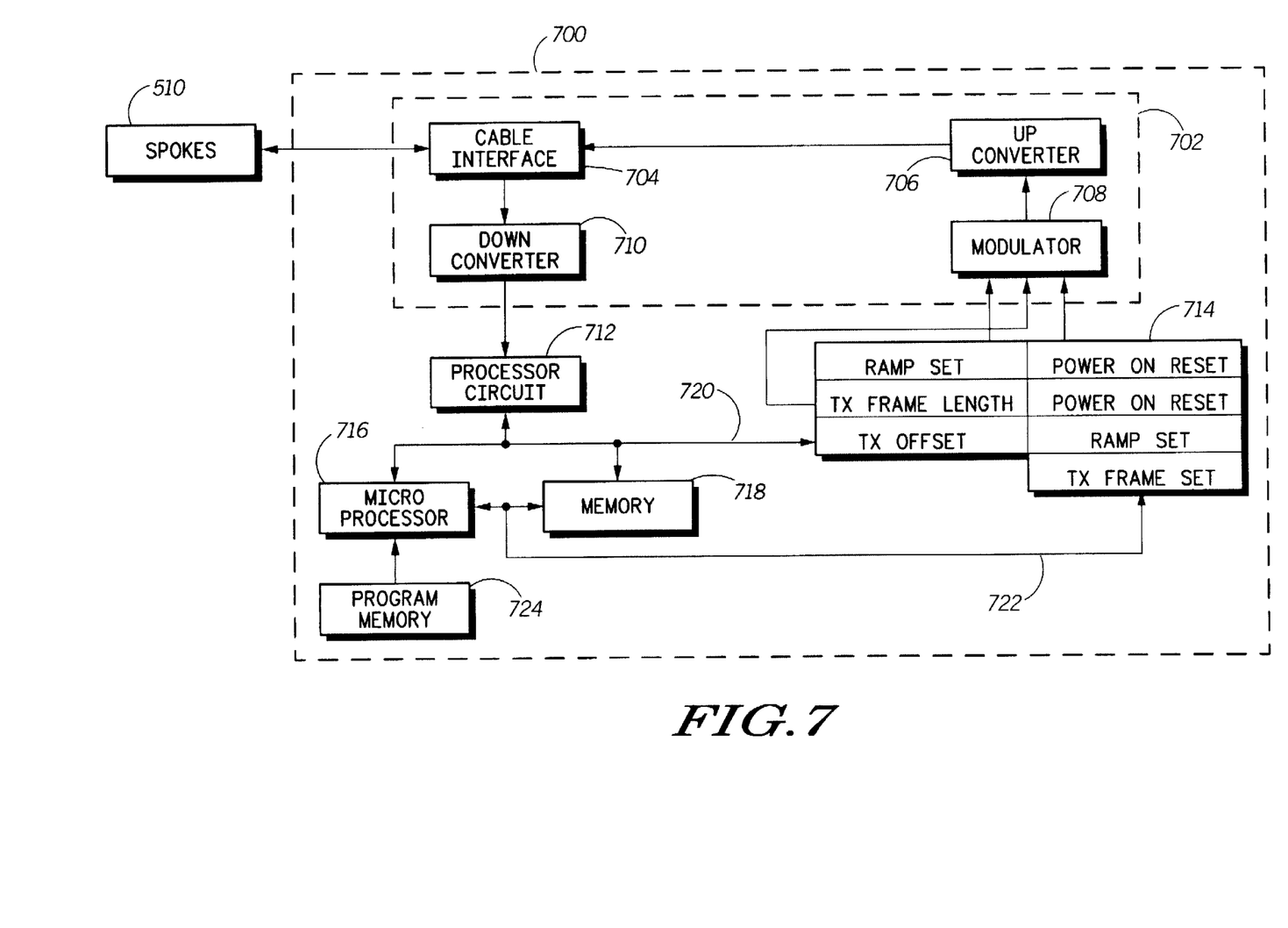
FIG. 7 is a schematic block diagram of a preferred subscriber cable access unit.

A general subscriber cable access unit 700 (CAU) is shown in FIG. 7. Any of the subscriber units shown and described above with respect to cable telecommunication system 100, including units 210 and 212, may be implemented using cable access unit 700. Cable access unit 700 is typically connected to the cable control unit 102 through a corresponding one of the spokes 510, as shown in FIGS. 5 and 7.

The CAU 700 includes an RF transceiver 702 that includes a cable interface 704, an UP converter 706, a modulator 708 and a DOWN converter 710. The cable interface 704 provides an interface to either coaxial or fiber-optic cables, whereby RF signals from the UP converter 706 are placed on the spokes 510 and RF signals from the spokes 510 are downloaded to the DOWN converter 710. The modulator 708 processes digital signals into analog signals that are converted to their proper frequency for transmission by the UP converter 706.

The CAU 700 also includes a processor circuit 712, that is preferably an application specific integrated processor (ASIC) rather than a generic microprocessor, in view of the intensive nature of the processing requirements. ASIC 712 preferably includes registers 714 to provide further increases in performance. Registers 714 comprise seven registers that are labeled as follows: TX Frame Set, TX Frame Length, TX Offset, Ramp Set, Ramp Reset, Power On Set, and Power On Reset. The registers are connected to a microprocessor 716 and to a memory 718 via an address bus 720 and a data bus 722. The functions of the registers 714, as well as an explanation of how the CAU 700 operates, follows in conjunction with FIG. 8.

Figure 8:
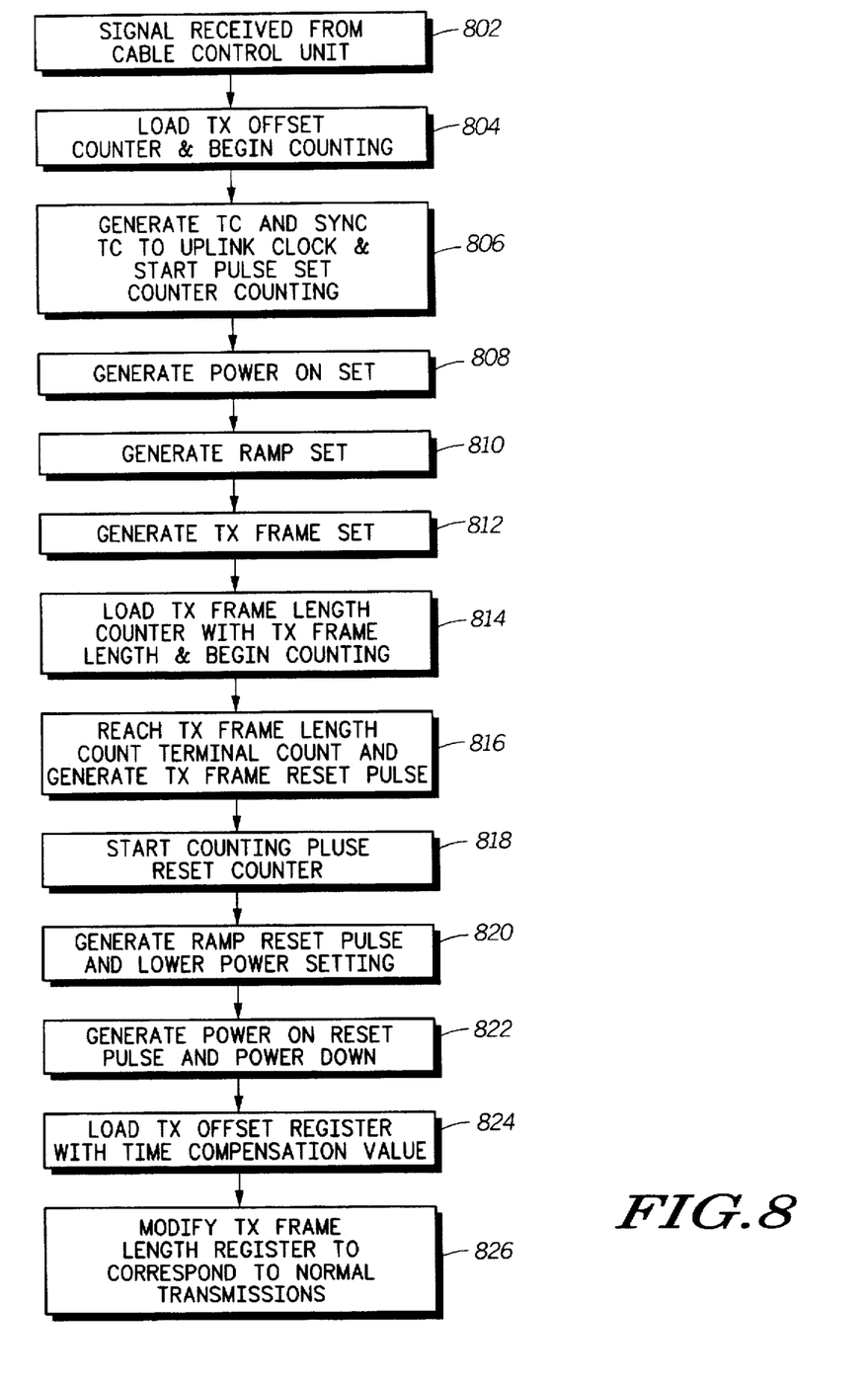
FIG. 8 is a flow chart illustrating the processing performed by the subscriber cable access unit of FIG. 7 for timing alignment and in compensating for the propagation delay.

FIG. 8 shows a flow chart that illustrates the processing performed by the CAU 700 of FIG. 7 during timing alignment and during propagation delay compensation. Persons skilled in the art will understand that the instructions for executing the steps shown in FIG. 8 are preferably implemented within ASIC 712 and/or stored in a program memory 724 that is connected to the microprocessor 716. The program memory 724 may be any non-volatile memory, such as Read-Only Memory (ROM), or it may be volatile memory, such as Random Access Memory (RAM) that is loaded upon the application of power to the CAU 700.

When the CAU 700 is initially turned on, the TX Offset register in the registers 714 is initialized with an arbitrary value that represents the worst case offset between the cable control unit 102 and the CAU 700, and the CAU 700 is set to transmit only short bursts. Processing in the CAU 700 begins upon the receipt of the first bit of a time slot from the control unit 102, as shown by a step 802. The receipt of the first bit (also referred to as the downlink trigger) causes, in a step 804, the value of TX Offset to be loaded into the TX Offset Counter and for counting to begin (the counting is driven by the a downlink bit clock).

After the TX Offset Counter reaches the terminal count, a TC signal is generated that is synchronized to the uplink bit clock and then the synchronized signal causes the Pulse Set Counter to begin counting in a step 806. The uplink bit clock provides an extra frame of reference that all subsequent signals are synchronized to. The TX Pulse Set Counter effectively produces three signals that are responsible for the transmission of information from the CAU 700. These three signals are set in steps 808, 810 and 812, when the Pulse Set Counter equals the value stored in each of registers Power On Set, Ramp Set and TX Frame Set, respectively. The Power On Set signal effectively turns on the RF transmitter, while the Ramp Set signal effectively increases the transmitter power from an initial low power setting to full power. Once a full power setting has been achieved, the TX Frame Set signal effectively puts data on the uplink.

A step 814 of loading the TX Frame Length Counter with the value from the TX Frame Length register and the initialization of counting by the TX Frame Length Counter occurs after TX Frame Set is generated in the step 812. The step 814 occurs after the steps 808–812 have occurred such that the step 814 effectively loads data onto the uplink and transmits it until the TX Frame Length Counter reaches its terminal count, as shown by the generation of a TX Frame Reset Pulse in a step 816. The CAU 700 thus transmits the number of bits in accordance with the value stored in the TX Frame Length register. This value corresponds to a short burst during the time alignment process and a normal burst thereafter. Additionally, it is preferable for the short burst information to consist of three identical and contiguous SYNC words followed by an identification word. The SYNC words preferably correspond to the bit pattern of "1F53A0," as described above.

The generation of the TX Frame Reset Pulse begins the power down cycle for the CAU 700 in preparation for the next uplink transmission. In a step 818, a Pulse Reset Counter begins counting once the TX Frame Reset Pulse has been generated. When the value of the Pulse Reset Counter equals the Ramp Reset register value, in a step 820, a Ramp Reset Pulse is produced that effectively lowers the transmitter's power back to a nominal setting. Similarly, when the value of the Pulse Reset Counter reaches the value of the Power On Reset register, a Power On Reset pulse is generated in a step 822 that effectively turns off the transmitter until the next transmission cycle.

The transmission of data during the step 814 enables the control unit 102 to determine the propagation delay between the control unit 102 and the CAU 700 as described above. The control unit 102 subsequently transmits a time compensation value to the CAU 700 that is loaded into the TX Offset register to replace the worst case value used during time alignment in a step 824.

Once the new offset value is received, the CAU 700, in a step 826, modifies the value stored in the TX Frame Length register to correspond to normal burst length, rather than short burst length. Additional transmissions between the control unit 102 and the CAU 700 are thus synchronized to account for the propagation delay between the two devices. This synchronization procedure is preferably performed at the beginning of each bi-directional transmission series, and whenever the occurrence of excessive errors is recognized by the system (essentially requiring the time synchronization function to be re-executed).

It will be understood that the foregoing is only illustrative of the principles of the invention, and that various modifications can be made by those skilled in the art without departing from the scope and spirit of the invention. For example, while the cable telecommunications system shown in FIG. 1 utilizes a PSTN for connection to a local telephone system, alternative connections may be made directly to other cable telecommunication systems, or directly to various long distance service providers.

We claim:

1. A method for synchronizing timing of components of a telecommunication system comprising the steps of:
   receiving, at a subscriber equipment, a signal indicative of a receiving window of a control unit that routes information provided by the subscriber equipment;
   in response to the step of receiving, transmitting, from the subscriber equipment to the control unit, a signal burst which is sampled at the control unit during the receiving window, the receiving window being adjusted in time by a fixed portion of a propagation delay from the subscriber equipment to the control unit;
   receiving, at the subscriber equipment, time alignment information indicative of a variable portion of the propagation delay from the subscriber equipment to the control unit calculated from a timing of arrival of the signal burst at the control unit; and
   transmitting, from the subscriber equipment, an information burst positioned in time in accordance with the time alignment information.

2. The method of claim 1 wherein the receiving window has a first-duration, wherein the step of transmitting the signal burst comprises transmitting the signal burst having a second duration which is less than or equal to about half of the first duration.

3. The method of claim 1, the fixed portion of the propagation delay being calculated by the control unit determining a delay between a global probe signal sent to a node associated with at least one subscriber equipment and detection of a received signal at the control unit sent by the at least one subscriber equipment in response to the global probe signal.

4. The method of claim 3, wherein the received signal is detected at the control unit by comparing a strength of the received signal to a predetermined threshold.

5. In a telecommunication system transmitting over coaxial cable and using a communication scheme wherein bursts of information from a subscriber equipment must be received at a control unit during a receiving window having a first duration and wherein an unspecified propagation delay exists between the subscriber equipment and the control unit, a method for synchronizing an arrival of the bursts of information with the receiving window comprising the steps of:
   receiving, at the subscriber equipment, a receive time slot signal indicative of a timing of the receiving window;
   transmitting, from the subscriber equipment to the control unit, a short burst signal timed in a predetermined relationship to the receive time slot signal, the short burst signal being received at the control unit during the receiving window which is positioned in time in accordance with a common portion of the unspecified propagation delay;
   receiving, at the subscriber equipment, time alignment information indicative of the unspecified propagation delay between the subscriber equipment and the control unit; and
   transmitting, from the subscriber equipment, a plurality of information burst signals each being advanced in time, compared to the short burst signal, relative to the receive time slot signal.

6. The method of claim 5 wherein the step of transmitting the short burst signal comprises transmitting the short burst signal having a second duration which is less than or equal to about half of the first duration.

7. The method of claim 5, the fixed portion of the unspecified propagation delay being calculated by the control unit determining a delay between a global probe signal sent to a node associated with one or more subscriber equipment and detection of a received signal at the control unit sent by the one or more subscriber equipment in response to the global probe signal.

8. In a telecommunication system that requires bursts of information from a subscriber equipment to be received at a control unit during a timing window having a first duration and wherein an undetermined timing delay exists between the subscriber equipment and the control unit, a method for synchronizing an arrival of the bursts of information at the control unit comprising the steps of:
   receiving a time slot signal from the control unit at the subscriber equipment;
   transmitting, from the subscriber equipment, a subscriber equipment timing burst having a second duration less than half the first duration, the subscriber equipment timing burst being transmitted at a predetermined amount of time following reception of the time slot signal;
   receiving, at the subscriber equipment, time alignment information indicative of a variable portion of the undetermined timing delay between the subscriber equipment and the control unit; and
   transmitting, from the subscriber equipment, a plurality of information burst signals each being positioned in time in accordance with the time alignment information, the timing window being shifted in time by an amount correlating to a fixed portion of the undetermined timing delay between the subscriber equipment and the control unit.

9. The method of claim 8, the fixed portion of the undetermined timing delay being calculated by the control unit determining a delay between a global probe signal sent to a node associated with one or more subscriber equipment and detection of a received signal at the control unit sent by the one or more subscriber equipment in response to the global probe signal.

10. A method for synchronizing a timing of information transmission in a telecommunication system comprising the steps of:

transmitting a time slot signal from a control unit to a subscriber unit;

receiving, at the control unit, a propagation delay measurement signal during a receiving window of the control unit which is positioned in time in accordance with a common portion of a control unit to subscriber unit propagation delay;

determining at what point during the receiving window the propagation delay measurement signal arrives at the control unit;

generating time alignment information in response to the step of determining;

transmitting the time alignment information to the subscriber unit; and receiving, at the control unit, subsequent subscriber signals positioned in time in accordance with the time alignment information.

11. The method of claim 10, wherein the step of receiving the propagation delay measurement signal comprises receiving the propagation delay measurement signal having a duration less than or equal to about one half of a duration of the receiving window.

12. The method of claim 10, the fixed portion of the control unit to subscriber unit propagation delay being calculated by the control unit determining a delay between a global probe signal sent to a node associated with one or more subscriber units and detection of a received signal at the control unit sent by the one or more subscriber units in response to the global probe signal.

13. The method of claim 12, wherein the received signal is detected at the control unit by integrating the received signal to provide an integrated value and further, identifying a predetermined increase in the integrated value.

14. In a telecommunication system wherein an undetermined propagation delay exists between a subscriber equipment and a control unit that routes signals from the subscriber equipment, and wherein the signals from the subscriber equipment must be received during a predetermined time slot at the control unit, a method for synchronizing a timing of reception of the signals from the subscriber equipment comprising the steps of:

transmitting a global probe signal to a plurality of different ones of the subscriber equipment;

receiving a received signal comprising combined response signals from the plurality of different ones of the subscriber equipment;

determining a fixed portion of the undetermined propagation delay by calculating a timing difference between the step of transmitting and the step of receiving; and offsetting a position of the predetermined time slot by the fixed portion of the undetermined propagation delay.

15. A method for synchronizing timing of components of a telecommunication system comprising the steps of:

transmitting a global probe signal from a first unit to a plurality of subscriber units, the first unit receiving signals during a predetermined time slot;

receiving a received signal comprising combined response signals from the plurality of subscriber units;

determining a fixed portion of an undetermined propagation delay between the first unit and the plurality of subscriber units by calculating a timing difference between transmitting the global probe signal and receiving the received signal; and offsetting a position of the predetermined time slot by the fixed portion of the undetermined propagation delay.

16. In a telecommunication system utilizing coaxial cable as a transmission medium and wherein an undetermined propagation delay exists between a subscriber equipment and a control unit that routes signals from the subscriber equipment, and wherein the signals from the subscriber equipment must be received during a predetermined time slot at the control unit, the predetermined time slot having a first duration, a method for synchronizing a timing of reception of the signals from the subscriber equipment comprising the steps of:

offsetting in time the predetermined time slot by an amount correlating to a fixed portion of the undetermined propagation delay;

transmitting a time slot signal from the control unit to the subscriber equipment;

receiving, at the control unit, a propagation delay measurement signal transmitted from the subscriber equipment, the propagation delay measurement signal having a second duration less than or equal to one half of the first duration, the propagation delay measurement signal being received following a beginning of the predetermined time slot;

determining a variable portion of the undetermined propagation delay by measuring an amount of time following the beginning of the predetermined time slot that the propagation delay measurement signal is received; and transmitting to the subscriber equipment time alignment information indicative of the variable portion of the undetermined propagation delay.

17. The method of claim 16, the fixed portion of the undetermined propagation delay being calculated by the control unit determining a delay between a global probe signal sent to a node associated with one or more subscriber units and detection of a received signal at the control unit sent by the one or more subscriber units in response to the global probe signal.

18. In a telecommunication system that requires bursts of information from a subscriber equipment to be received at a control unit during a timing window having a first duration and wherein an undetermined timing delay exists between the subscriber equipment and the control unit, an article of manufacture comprising a program memory directing the subscriber equipment, the program memory comprising:

instructions directing the subscriber equipment to receive a time slot signal from the control unit at the subscriber equipment;

instructions directing the subscriber equipment to transmit a subscriber equipment timing burst having a second duration less than half the first duration, the subscriber equipment timing burst being transmitted at a predetermined amount of time following reception of the time slot signal;

instructions directing the subscriber equipment to receive time alignment information indicative of a variable portion of the undetermined timing delay between the subscriber equipment and the control unit; and instructions directing the subscriber equipment to transmit a plurality of information burst signals each being positioned in time in accordance with the time alignment information, the timing window being shifted in time by an amount correlating to a fixed portion of the undetermined timing delay between the subscriber equipment and the control unit.

19. In a telecommunication system wherein an undetermined propagation delay exists between a subscriber equipment and a control unit that routes signals from the subscriber equipment, and wherein the signals from the subscriber equipment must be received during a predetermined time slot at the control unit, an article of manufacture comprising a program memory directing the control unit, the program memory comprising:

instructions directing the control unit to transmit a time slot signal to the subscriber equipment, the time slot signal indicative of a timing of the predetermined time slot;

instructions directing the control unit to receive, from the subscriber equipment, a propagation delay measurement signal during the predetermined time slot, the predetermined time slot positioned in time in accordance with a common portion of the undetermined propagation delay; and instructions directing the control unit to determine an amount of time after a beginning of the predetermined time slot that the propagation delay measurement signal is received.

20. A method for synchronizing timing of components of a telecommunication system comprising the steps of:

providing signal information to a control unit from a subscriber unit, the signal information having a beginning position and an end position;

producing an energy profile of the signal information, the profile including a value representing the total energy of the signal information;

determining where the approximate half-sum value of the total energy is located within the energy profile;

setting a start position within the signal information based upon the location of the half-sum value;

locating at least one SYNC word within the signal information; and transmitting an offset value to the subscriber unit that compensates for substantially all of the delay between the start position and the beginning position.

21. The method of claim 20, wherein the step of providing comprises the steps of:

receiving an analog signal;

converting the analog signal into a digital signal by sampling the analog signal, the digital signal being divided into symbols with each symbol being represented by at least one sample, a predetermined number of symbols being representative of a complete time slot of information; and loading the complete slot of information into a main memory.

22. The method of claim 21, wherein the step of converting produces digital signals that are loaded into a buffer memory and the step of loading loads the complete slot of information from the buffer memory to the main memory.

23. The method of claim 21, wherein each symbol is represented by at least one sample and the step of producing comprises the steps of:

calculating a value of sample energy for each symbol based on at least one sample of each symbol; and integrating a set of the sample energy calculations over the complete slot of information to produce the energy profile.

24. The method of claim 23, wherein each symbol is represented by four samples and the step of calculating calculates samples energy for each symbol based on every other sample.

25. The method of claim 24, wherein the set of energy calculations integrated in the step of integrating only includes every fourth energy calculation.

26. The method of claim 21, further comprising the step of processing the complete slot of information in a timing detection program to determine the optimum sample, the step of processing occurring between the steps of setting and locating.

27. The method of claim 26, further comprising the step of extracting data from the complete slot by processing the complete slot in a detection program based on the optimum sample to remove noise from the signal information, the step of extracting occurring between the steps of processing and locating.

28. The method of claim 20, wherein the step of determining comprises the steps of:

dividing the value of total energy by two to produce the half-sum value; and searching the energy profile to find a location within the profile that most closely matches the half-sum value.

29. The method of claim 20, wherein the step of locating searches the signal information for three SYNC words.

30. The method of claim 29, wherein the three SYNC words are located adjacent to each other within the signal information.

31. The method of claim 30, wherein at least one of the three SYNC words is equivalent to "1F53A0."

32. A control unit for use in a synchronous telecommunication system that connects a plurality of subscriber units to the control unit, the control unit comprising:

an RF transceiver that provides an interface between the control unit and the telecommunication system, the RF transceiver providing digital signals to the control unit, a predetermined number of digital signals comprising a complete time slot;

main memory coupled to the RF transceiver to receive the complete time slot;

processing circuitry coupled to the main memory to process the time slot to at least determine any time delay between the control unit and each of the subscriber units by first estimating where signal information is located within the time slot before extracting the signal information, the processing circuitry providing to each subscriber unit an offset value that compensates for the delay determined for each respective subscriber unit; and the RF transceiver provides digital signals by sampling the RF signals received from the subscriber units and the processing circuitry calculates total energy for a plurality of the samples, integrates the total energy calculation over the complete time slot, determines a half-sum value of the total energy and determines where the closest match of the half-sum value exists within the time slot.

33. The control unit of claim 32 further comprising program memory coupled to the processing circuitry that contains programs for the processing circuitry to execute.

34. A control unit for use in a synchronous telecommunication system that connects a plurality of subscriber units to the control unit, the control unit comprising:

an RF transceiver that provides an interface between the control unit and the telecommunication system, the RF transceiver providing digital signals to the control unit a predetermined number of digital signals comprising a complete time slot;

main memory coupled to the RF transceiver to receive the complete time slot;

processing circuitry coupled to the main memory to process the time slot to at least determine any time delay between the control unit and each of the subscriber units by first estimating where signal information is located within the time slot before extracting the signal information, the processing circuitry providing to each subscriber unit an offset value that compensates for the delay determined for each respective subscriber unit; and the processing circuitry searches the time slot in main memory for at least one SYNC word.

35. The control unit of claim 34, wherein "1F53A0" is at least one of the SYNC words the processing circuitry searches for.

36. A method for synchronizing timing of components of a telecommunication system, the telecommunication system including downlink transmissions from a control unit to at least one subscriber unit and uplink transmissions from the at least one subscriber unit to the control unit, each transmission having a transmission length, the method comprising the steps of:

receiving a downlink trigger from the control unit;

offsetting the next uplink transmission by a delay common to the at least one subscriber unit representative of worst case propagation delay between the control unit and a selected one of the at least one subscriber unit;

turning on an RF transceiver in the selected subscriber unit to a transmission power setting;

setting the transmission length to correspond to a short burst;

formatting at least one SYNC word within a signal corresponding to the next uplink transmission; and transmitting the signal corresponding to the next uplink transmission.

37. The method of claim 36, wherein the step of turning on an RF transceiver includes the steps of:

turning on the transceiver at a low power setting; and increasing power of the RF transceiver from the low power setting to a transmitting power setting.

38. The method of claim 36, wherein the step of formatting includes formatting three consecutive SYNC words within the signal corresponding to the next uplink transmission.

39. The method of claim 38, wherein at least one of the SYNC words formatted in the step of formatting is formatted to a bit pattern corresponding to "1F53A0."

40. The method of claim 39, wherein the three consecutive SYNC words have a bit pattern corresponding to "1F53A0."

41. The method of claim 36 further comprising the steps of:

decreasing power of the RF transceiver from the transmitting power setting to a low power setting after the step of transmitting the signal; and turning off the transceiver.

42. The method of claim 36, further comprising the steps of:

receiving a propagation delay offset value from the control unit at a time after the step of transmitting the signal;

modifying the offset of the next uplink to the delay offset value; and resetting the transmission length to correspond to a normal burst.

43. A plurality of subscriber access units for use in a synchronous telecommunication system that connects a control unit to the plurality of subscriber access units based on the control unit receiving transmissions from the subscriber units within a predetermined receiving window, wherein the predetermined receiving window for each of the plurality of subscriber units is determined by offsetting a timing of the window by a delay common to the subscriber access units, at least one of the subscriber access units comprising:

an RF transceiver that provides an interface between the subscriber access unit and the telecommunication system, the RF transceiver providing digital signals to the subscriber access unit, a predetermined number of digital signals comprising a complete time slot;

a plurality of temporary registers that store values for at least a delay offset value and a transmission frame length;

specialized processing circuitry coupled to the RF transceiver that receives the digital signals from the RF transceiver and provides digital signals to the RF transceiver;

main memory coupled to the specialized processing circuitry; and a processor coupled to the main memory and to the plurality of registers, the processor responding to receiving a downlink trigger by providing a short burst uplink signal to the specialized processing circuitry until a delay offset value is received from the control unit, at which time normal uplink bursts are provided at a time such that the uplink burst is received by the control unit aligned with the time of the receiving window.

44. The subscriber access unit of claim 43, wherein the specialized processing circuitry is an application specific integrated circuit (ASIC).

45. The subscriber access unit of claim 44, wherein the ASIC and the plurality of registers are formed from a single integrated circuit.

46. The subscriber access unit of claim 43, wherein the plurality of registers further includes registers that stores a value corresponding to a timing trigger to turn the RF transceiver on.

47. The subscriber access unit of claim 46, wherein the plurality of registers further includes registers that stores a value corresponding to a timing trigger to increases power to the RF transceiver from an initial power setting to transmit power.

48. A method for providing synchronous transmissions in a telecommunication system having a plurality of subscriber units and a control unit that communicate based on the control unit receiving information during a predetermined receiving window, the method comprising the steps of:

system initialization including the steps of:

establishing a fixed portion propagation delay; and compensating for the fixed portion; and individual two way communication initialization including the steps of:

receiving a complete slot of information that represents a short burst at the control unit from a selected subscriber unit, the short burst including at least one SYNC word;

estimating the location of the average power of the information within the complete slot in the control unit;

extracting data from the complete slot based on the estimate in the control unit;

searching the extracted data for the at least one SYNC word in the control unit;

providing from the control unit to the selected subscriber unit an offset delay value such that subsequent transmission from the selected subscriber unit are time aligned with the appropriate receiving window;

adjusting transmission timing of the selected subscriber unit based on the received offset delay value; and changing, at the selected subscriber unit, from a short burst length to normal burst length.

49. The method of claim 48, wherein the short burst includes three consecutive SYNC words.

50. The system of claim 49, wherein at least one of the three consecutive SYNC words corresponds to a bit pattern of "1F53A0."

* * * * *